(12) United States Patent
Goodwin, III

(10) Patent No.: US 8,276,808 B2
(45) Date of Patent: Oct. 2, 2012

(54) METHODS OF TWO-SIDED PRINTING

(75) Inventor: John C. Goodwin, III, Suwanee, GA (US)

(73) Assignee: NCR Corporation, Duluth, GA (US)

( * ) Notice: Subject to any disclaimer, the term of this patent is extended or adjusted under 35 U.S.C. 154(b) by 0 days.

(21) Appl. No.: 12/955,106

(22) Filed: Nov. 29, 2010

(65) Prior Publication Data

US 2012/0132700 A1 May 31, 2012

(51) Int. Cl.
*G07G 1/00* (2006.01)
(52) U.S. Cl. .......................... 235/3; 347/171
(58) Field of Classification Search ...... 235/3; 347/171, 347/16
See application file for complete search history.

(56) References Cited

U.S. PATENT DOCUMENTS

| | | | |
|---|---|---|---|
| 7,782,349 B2 * | 8/2010 | Baba et al. | 347/171 |
| 7,830,404 B2 * | 11/2010 | Yamada | 347/171 |
| 8,009,183 B2 * | 8/2011 | Baba | 347/171 |
| 2004/0105126 A1 * | 6/2004 | Minowa et al. | 358/1.18 |
| 2007/0211099 A1 * | 9/2007 | Lyons et al. | 347/16 |
| 2009/0015647 A1 * | 1/2009 | Rawlings et al. | 347/213 |

* cited by examiner

*Primary Examiner* — Daniel Hess
(74) *Attorney, Agent, or Firm* — Robert S. Chee; Dana T. Hustins

(57) ABSTRACT

An application or print driver on a point-of-sale terminal determines the break point of a transaction record to be printed on two sides of media. The print data is sent to the printer in a particular amount of print data for print on the front side followed by a particular amount of print data for print on the back side. The application or print driver then alternates between the print data on the front and the print data on the back until the end of the transaction record is transmitted. When all print data for the front is transmitted, an end of front data indicator is sent. When all print data for the back is transmitted, an end of back data indicator is sent. When both indicators are sent, the printer is allowed to cut the transaction record.

22 Claims, 3 Drawing Sheets

METHODS OF TWO-SIDED PRINTING

FIELD OF THE INVENTION

The present invention relates generally to printing on two sides of two-sided media.

BACKGROUND

Duplex or dual-sided direct thermal printing of transaction documents or receipts is described in U.S. Pat. Nos. 6,784,906 and 6,759,366. The printers are configured to allow printing on both sides of sheet media moving along a feed path through the printer. In such printers a direct thermal print head is disposed on each side of the media feed path. A thermal print head faces an opposing platen across the feed path from the print head.

In direct thermal printing, a print head selectively applies heat to paper or other sheet media comprising a substrate with a thermally sensitive coating. The coating changes color when heat is transferred, by which "printing" is provided on the coated substrate. For dual-sided direct thermal printing, the sheet media substrate may be coated on both sides.

Duplex or dual-sided direct thermal printing has been described for providing variable information on both sides of a paper receipt, to save materials and to provide flexibility in providing information to customers. The printing could be driven electronically or by computer using a computer application program which directs dual-sided printing.

When a customer makes a purchase or return at a retail store, a receipt or credit voucher may be printed as reference of the transaction. An employee may use a point of service (POS) terminal to enter a transaction and a printer operatively connected to the POS terminal may print the receipt or credit voucher. Ensuring customer satisfaction by printing the receipt or credit voucher in an efficient manner and as quickly as possible is important for retailers to retain customer loyalty.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

Techniques and methods are provided that improve the speed of printing transaction records with a printer capable of printing on two-sides on two-sided media.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Methods and techniques are described to increase the speed and efficiency of printing transaction records on printers capable of printing on two sides of media. When a customer enters a retail outlet and purchases a large number of items, the time it takes to print the receipt on two-sided media may take longer than expected. For example, for large amounts of items, a download time of might take up to ten seconds when 600 items are involved. This may result in the cashier believing that the system has failed and turning off or resetting the system, stopping the print command and the transaction. Reducing this lag time between the completion of entering the items in the point-of-sale terminal and when a receipt begins and completes printing is important for customer satisfaction and to improve queuing time.

Waiting until the transaction is completed before sending the print data is a result of providing consumers a "clean" receipt. A clean receipt is one that removes voided items, corrects any other errors, and shows a summed number for each item. For example, if an item X is sold, followed by 2 items of Y, and then another item X, rather than printing 2 items of X separately on the receipt, the printed receipt will show a summed number of 2 for item X. This makes it much easier for the consumer to read and understand.

Printer

A printer operatively connected to a POS terminal may print via direct thermal printing, whereby a print head selectively applies heat to paper or other sheet media comprising a substrate with a thermally sensitive coating. The coating changes color when heat is applied, by which "printing" is provided on the coated substrate. A printer may also print via dot matrix, laser, or inkjet. However, any type of printer may be used.

Figure 1A:
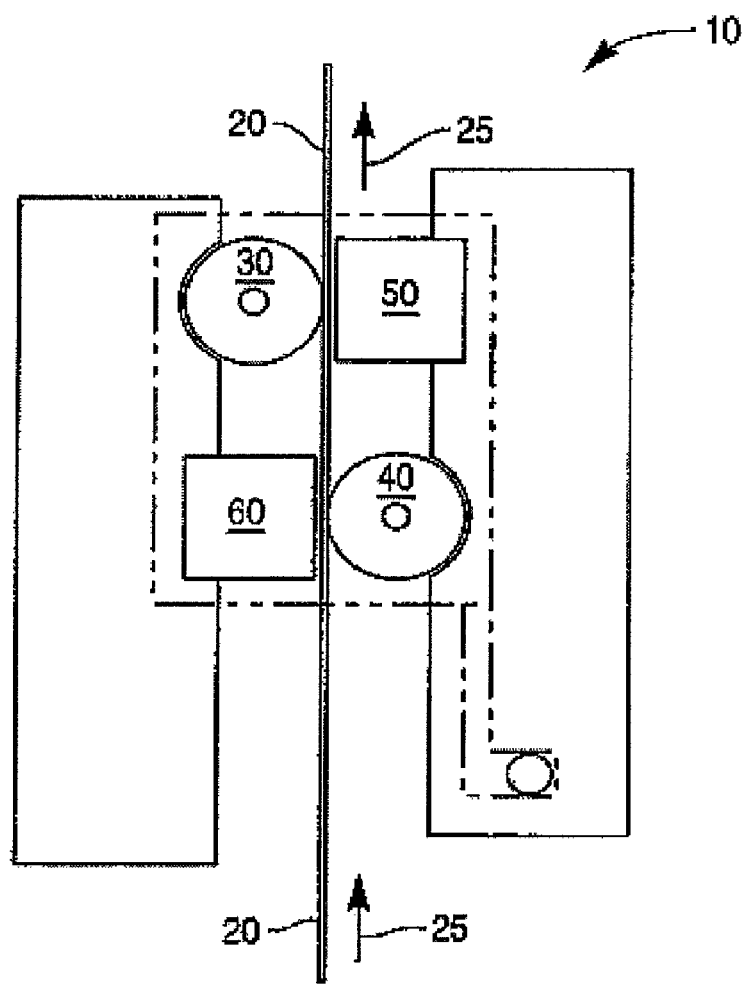
FIG. 1A is an illustration of components of a printer.

Key components of a standard POS printer are illustrated in FIG. 1A. FIG. 1A shows a schematic of a dual-sided imaging direct thermal printer 10 useable for dual-sided, single pass printing of transaction receipts or tickets at time of issue. The printer 10 operates on print media 20 which is double-sided thermal paper, e.g., comprising a cellulose-based or polymer substrate sheet coated on each side with heat sensitive dyes as described in U.S. Pat. Nos. 6,784,906 and 6,759,366. Multi-color printing capability can be provided on both sides of the receipt by using two or more dyes with sensitivity to different temperatures on a side where multi-color printing is desired. Substrates and heat sensitive color changing coatings for direct thermal printing media are generally well known in the art. Dual-sided direct thermal printing can be facilitated by a media 20 which includes dyes sensitive to different temperatures on opposite sides of the media 20, or by use of thermally resistant substrates to inhibit thermal printing on one side of the media 20 from affecting the coloration on the opposite side of the media 20.

As shown in FIG. 1A, the printer 10 has rotating platens 30 and 40 and opposing thermal print heads 50 and 60 on opposite sides of the receipt or ticket media 20. Dual-sided direct thermal printing of the media 20 occurs in a single pass at the time of the transaction or when a receipt or ticket is issued.

The media 20 passes through rotating platens 30 and 40 and opposing thermal print heads 50 and 60 in direction 25. The media 20 can be cut or severed to provide an individual receipt or ticket document, typically once printing is completed.

Sending Print Data to Printer

In an embodiment, an application or print driver on a point-of-sale terminal determines the break point of a transaction record to be printed on two sides of media. Providing this capability with the print driver may minimize the changes made to the point-of-sale terminal, as the application program would not have to be modified. In addition, limiting changes to the print driver rather than the application, may allow for easier modifications to the transmission of data (due to, for example, changes in data transmission speed or printing speed).

In large orders, where there are an extensive amount of items, breaking the print data into a front side and a back side saves the quantity of media that is used. Determining the break point may be based on a variety of factors. In an embodiment, the break point may simply be such that one half of the items purchased are to be printed on one side of the media and the other half of the items are to be printed on the other side of the media. The amount of items to print on each side may be based upon other factors as well. For example, a large company logo might be printed on the top front of the transaction record. Under this circumstance, the number of items that may be printed on the front side is less than the number of items that may be printed on the back side in order to accommodate the logo. In another example, transaction terms such as return policy or some other transaction related information (e.g. coupons, store announcements, etc.) might be printed on the back side of every transaction record. Under this circumstance, more items may be printed on the front side and less items are printed on the back side.

In an embodiment, a determination may be made that printing should occur on only one side. If very few items are purchased, the savings in media used and additional processing required for printing on two sides may outweigh the benefits sought in printing a transaction record on two sides. For example, there might only be a total of four items purchased. Under this circumstance, there may be minimal savings in the amount of media that is saved and the transaction record may be confusing to the consumer. With four items, three items may be printed on the front side and only one item and the transaction total on the back side. The consumer may not realize there is additional printing on the back of the receipt that can lead to the belief that the transaction record is incorrect. When the number of items does not reach a predetermined number, a determination may be made that printing is only to occur on a single side.

In an embodiment, once the break point is determined, the print data is sent to the printer with a particular amount of print data for print on the front side followed by a particular amount of print data for print on the back side. This allows the data to be transmitted to the printer continuously and without delays that would be encountered if the printer was left to determine all of the data that is to be printed on the front side and the back side. Instead, there is little delay in the print data being transmitted to the printer. In an embodiment, the amount of data sent for each particular cycle may vary based at least in part upon the data transmission speed. In another embodiment, the amount of data sent for each particular cycle may vary based at least in part upon the speed of printing by the printer. Other factors may also vary the amount of print data sent, such as the size of the cache on the printer, and the amount of media left within the printer (the amount may slow down if the paper is running low and needs to be changed).

In an embodiment, each subset of print data that is sent for a particular side is indicated by a header and a footer. The header indicates to the printer that a subset of particular data is arriving that is for a particular side (e.g. "front side print data beginning", "back side print data beginning"). The footer indicates to the printer that a subset of particular data being received for a particular side is ending (e.g. "front side print data ending", "back side print data ending"). Any type of indicator may be used to indicate that the subset is beginning or ending. In other embodiments, there may simply be a header with no footer for each subset of data, or a footer with no header for each subset of data.

In an embodiment, the header and/or footer may also indicate other information to the printer. For example, the header or footer might also include an identification number to indicate which subset is arriving and that no data is missing. Each subset of data may be numbered sequentially so that the printer is able to be aware of any potentially missing data. Under this circumstance, a printer may receive subsets of printer data identified as 121, 122, 123, and 125. When there is a missing number to the sequence, there is a missing subset of printer data that may be re-transmitted. In an embodiment, each side of media receives its own sequential identification numbers of data. In an embodiment, each subset of printer data is given a sequential identification number with no regard to side. In an embodiment, a new sequence of identification numbers may be re-started if a new transaction is taking place.

Figure 1B:
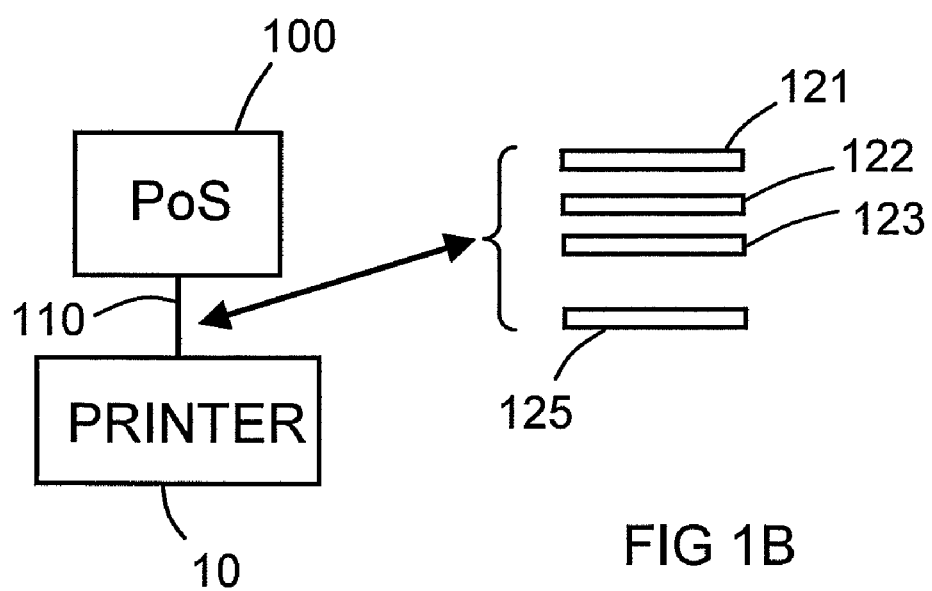
FIG. 1B is an illustration a terminal transmitting print data to the printer, according to an embodiment of the invention.

An illustration of print data sent in subsets to the printer is shown in FIG. 1B. In FIG. 1B, point-of-sale terminal 100 is connected to two-sided printer 10 via connection 110. Once the print data break point is determined, subsets of print data are sent by the point-of-sale terminal 100 to two-sided printer 10. Subsets of print data 121, 122, 123, and 125 are sent over connection 110. In this example, as stated above, a subset of print data 124 is missing from the sequential sequence. When the printer recognizes that not all print data is received, the printer 10 may return an error flag to the point-of-sale terminal 100

In an embodiment, the application or print driver alternates between the print data on the front and the print data on the back until the end of the transaction record is transmitted. This allows the printer to begin printing immediately and to continuously print without waiting for the entire transaction. For example, if a transaction had 600 items, the printer would otherwise have to wait until 300 items from the front were provided, and then print on the back side of the media. By being provided data as subsets of data and indicating which side to print, the printer may print immediately and continuously.

In an embodiment, print data may be compressed prior to any transmission of print data to the printer. A compression algorithm may be added to the application or printer code so that print data is compressed prior to transmission. A subsequent decompression algorithm may be added to the printer to decompress the compressed data received by the printer. Any type of compression algorithm may be employed. The compression algorithm increases the efficiency of print data sent and the same amount of line items may be sent to the printer in a smaller size data subset than without compression.

In an embodiment, when all print data for the front is transmitted, an end of front data indicator is sent. When all print data for the back is transmitted, an end of back data indicator is sent. When both indicators are sent, the printer is allowed to cut the transaction record. The end of front indicator may be in the same form as the footer indicating the end of a subset of print data, however, with an additional flag or indicator to indicate that the end of the entire side has been reached.

In another embodiment, when all print data has been transmitted, a single indicator is sent that indicates that the print data is completed. A single indicator, rather than two separate indicators minimizes the packets of data sent to the printer.

Once the printer received an indication that all print data has been received, then the printer is allowed to cut or slit the media when the transaction record has been printed. The transaction record may then be provided to the consumer.

Workflow for Sending Print Data

Figure 2:
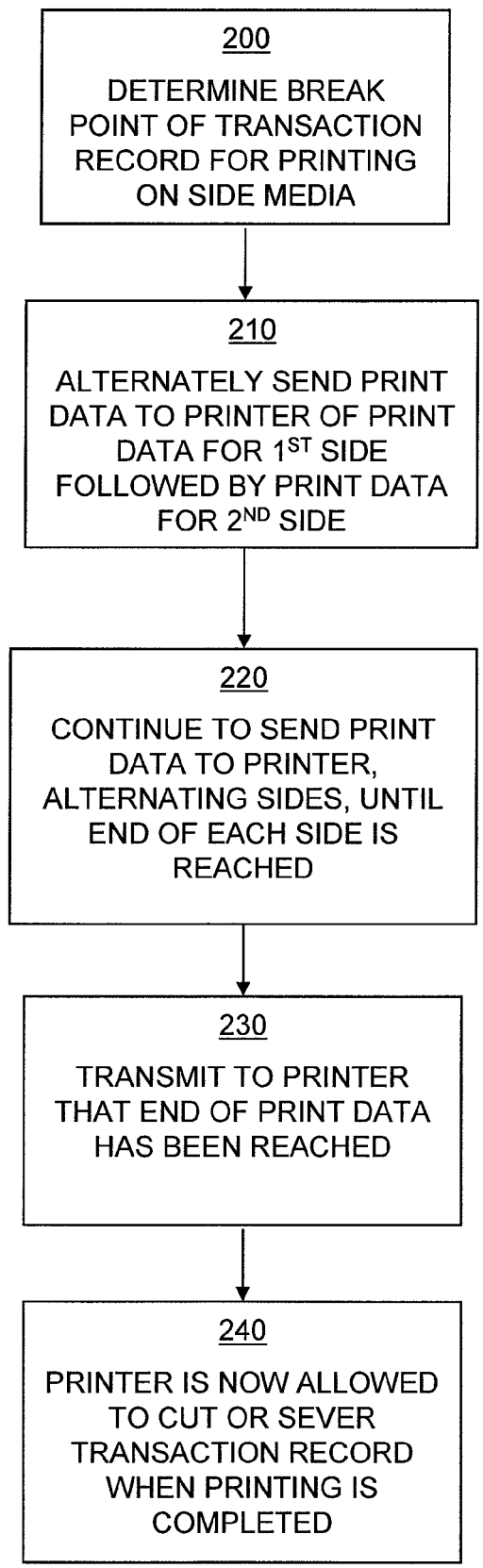
FIG. 2 illustration of a workflow for sending print data to a printer for printing on two sides, according to an embodiment of the invention.

An example of a workflow, based upon an embodiment, is illustrated in FIG. 2. The process begins when the full transaction has been entered into the point-of-sale terminal. Once all item data is available, the break point of the transaction record is determined indicating where the break is for printing items on the first (or front) side of the media and for printing items on the second (or back) side of the media, as shown in step 200.

In step 210, the application or print driver of the point-of-sale terminal will transmit the print data with the break point determined in small subsets. Each subset of print data will be for the first side or second side. The application or print driver sends a subset of print data for the first side, followed by a subset for the second side. In step 220, this alternating sending of print data for one side and then the other side continues until all data for each side is sent. This allows the printer to begin printing the transaction record immediately and without delay.

In step 230, an indicator is sent to the printer once the end for all print data has been reached. This may be sent in a variety of forms. An ending indicator may be a single packet of data indicating that an end of print data has been reached. Alternatively, an end indicator might be sent for each side of media and when the end indicator for each side is reached, then the printer determines that all of the print data has been received.

In step 240, once the end indicator is received by the printer, the printer is now allows to cut or sever the transaction record once the transaction record has been completely printed. The cut transaction record may then be provided to the consumer as a record for the just completed transaction.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
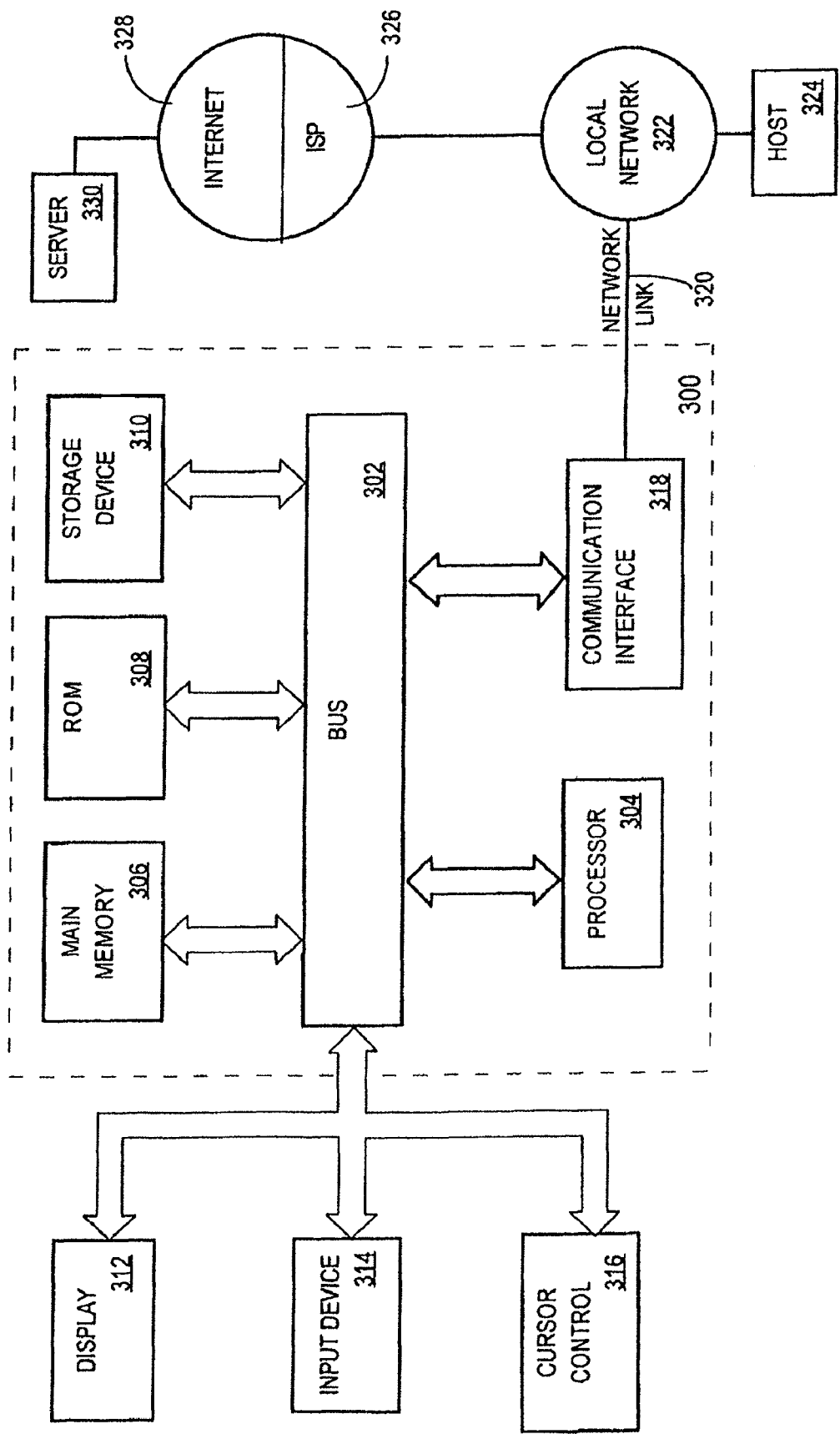
FIG. 3 is a block diagram of a system on which embodiments of the invention may be implemented.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 310. Volatile media includes dynamic memory, such as main memory 306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense

What is claimed is:

1. A method, comprising:
   determining a break point for transaction data to be printed, the break point indicating which items of the transaction data is to be printed on a first side of media and which items of the transaction data is to be printed on a second side of media;
   sending, sequentially, to a printer, a subset of transaction data of a predetermined number of items to be printed on the first side of media followed by a subset of transaction data of a predetermined number of items to be printed on the second side of media until all data of the transaction data has been sent, wherein the predetermined number of items is based at least in part upon the data transfer speed; and
   sending an end point indicator that all data has been sent, wherein the method is performed by a special purpose computing device.

2. The method of claim 1, wherein the break point is determined by an application running on a point-of-sale terminal.

3. The method of claim 1, wherein the break point is determined by driver code running on a point-of-sale terminal.

4. The method of claim 1, wherein the predetermined number of items is based at least in part upon print speed of the printer.

5. The method of claim 1, wherein each subset of transaction data sent further comprises an indicator indicating which side of the media the transaction data is to be printed.

6. The method of claim 1, wherein each subset of transaction data sent further comprises an indicator indicating that the subset of transaction data for printing on a particular side is beginning.

7. The method of claim 1, wherein each subset of transaction data sent further comprises an indicator indicating that the subset of transaction data for printing on a particular side is ending.

8. The method of claim 1, wherein the break point is based at least in part upon the total number of items in the transaction data.

9. The method of claim 1, wherein sending the end point indicator further comprises sending a) an end of first side indicator and b) an end of second side indicator, and the end point is indicated by receiving both indicators.

10. One or more storage media storing instructions which, when executed by one or more computing devices, cause performance of the method recited in claim 1.

11. The storage media of claim 10, wherein the predetermined number of items is based at least in part upon print speed of the printer.

12. The storage media of claim 10, wherein each subset of transaction data sent further comprises an indicator indicating which side of the media the transaction data is to be printed.

13. The storage media of claim 10, wherein sending the end point indicator further comprises sending a) an end of first side indicator and b) an end of second side indicator, and the end point is indicated by receiving both indicators.

14. The storage media of claim 10, wherein the break point is based at least in part upon the total number of items in the transaction data.

15. A system, comprising:
a point of sale terminal; and
a printer;
wherein the point-of-sale terminal determines a break point for transaction data to be printed, the break point indicating which items of the transaction data is to be printed on a first side of media and which items of the transaction data is to be printed on a second side of media;
the point-of-sale terminal sending, sequentially, to the printer, a subset of transaction data of a predetermined number of items to be printed on the first side of media followed by a subset of transaction data of a predetermined number of items to be printed on the second side of media until all data of the transaction data has been sent, wherein the predetermined number of items is based at least in part upon the data transfer speed;
the printer printing the subset of transaction data on the a side of the media; and
the point-of-sale terminal sending an end point indicator to the printer that all data has been sent.

16. The system of claim 15, wherein each subset of transaction data sent further comprises an indicator indicating that the subset of transaction data for printing on a particular side is beginning.

17. The system of claim 15, wherein each subset of transaction data sent further comprises an indicator indicating that the subset of transaction data for printing on a particular side is ending.

18. The system of claim 15, wherein sending the end point indicator further comprises the point-of-sale terminal sending a) an end of first side indicator and b) an end of second side indicator, and the end point is indicated by the printer receiving both indicators.

19. A method, comprising:
determining whether a break point for transaction data to be printed exists, the break point indicating which items of the transaction data is to be printed on a first side of media and which items of the transaction data is to be printed on a second side of media, wherein determining whether the break point exists is based upon a number of items to be printed in the transaction data reaching a particular threshold;
upon determining that a break point exists, determining the break point for transaction data to be printed;
sending, sequentially, to a printer, a subset of transaction data of a predetermined number of items to be printed on the first side of media followed by a subset of transaction data of a predetermined number of items to be printed on the second side of media until all data of the transaction data has been sent, wherein the predetermined number of items is based at least in part upon the data transfer speed; and
sending an end point indicator that all data has been sent, wherein the method is performed by a special purpose computing device.

20. The method of claim 19, wherein the predetermined number of items is based at least in part upon a number of items to be printed in the transaction data.

21. The method of claim 19, wherein the predetermined number of items is based at least in part upon print speed of the printer.

22. The method of claim 19, wherein the predetermined number of items is based at least in part upon a) a number of items to be printed in the transaction data and b) the print speed of the printer.

* * * * *